(12) United States Patent
Sawa et al.

(10) Patent No.: US 11,684,963 B2
(45) Date of Patent: Jun. 27, 2023

(54) METHOD AND APPARATUS FOR PRODUCING OUTER PANEL HAVING CHARACTER LINE

(71) Applicant: NIPPON STEEL CORPORATION, Tokyo (JP)

(72) Inventors: Yasunori Sawa, Tokyo (JP); Masahiro Saito, Tokyo (JP); Shigeru Yonemura, Tokyo (JP); Akira Egami, Tokyo (JP); Kohki Nakamura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 22 days.

(21) Appl. No.: 16/755,504

(22) PCT Filed: Dec. 25, 2017

(86) PCT No.: PCT/JP2017/046459
§ 371 (c)(1),
(2) Date: Apr. 10, 2020

(87) PCT Pub. No.: WO2019/073614
PCT Pub. Date: Apr. 18, 2019

(65) Prior Publication Data
US 2021/0220897 A1    Jul. 22, 2021

(30) Foreign Application Priority Data

Oct. 12, 2017    (JP) .................................. 2017-198328

(51) Int. Cl.
*B21D 28/26*        (2006.01)
*B21D 53/88*        (2006.01)

(52) U.S. Cl.
CPC ............. *B21D 28/26* (2013.01); *B21D 53/88* (2013.01)

(58) Field of Classification Search
CPC ........ B21D 24/00; B21D 22/22; B21D 53/88; B21D 22/26
See application file for complete search history.

(56) References Cited

U.S. PATENT DOCUMENTS 2,681,630 A * 6/1954 Hempel ................. B21D 22/22
72/350
4,778,730 A * 10/1988 Zucker ...................... B22F 7/08
428/552

(Continued)

FOREIGN PATENT DOCUMENTS

CN        105195587 B         5/2017
CN        106944545 A  *      7/2017    ............. B21D 22/22

(Continued)

OTHER PUBLICATIONS

JP-2019018225-A machine translation (Year: 2019).*

(Continued)

*Primary Examiner* — Michael W Hotchkiss
(74) *Attorney, Agent, or Firm* — Birch, Stewart, Kolasch & Birch, LLP

(57) ABSTRACT

In a method for producing an outer panel having a character line, a punch includes a projecting portion for forming a bent surface of the character line at a punch top portion, and a punch shoulder R portion. A contact pressure applied to a blank by at least one of the projecting portion and the punch shoulder R portion is higher than a contact pressure applied to the blank by a remaining portion of the punch which excludes the projecting portion and the punch shoulder R portion. A static friction coefficient of a first portion of the punch which includes at least one of the projecting portion and the punch shoulder R portion with respect to the blank is larger than a static friction coefficient of a second portion of the punch which excludes the first portion with respect to the blank.

9 Claims, 8 Drawing Sheets

(56) References Cited

U.S. PATENT DOCUMENTS

| | | | | |
|---|---|---|---|---|
| 5,379,227 | A * | 1/1995 | Tang | B21D 22/26 700/98 |
| 5,551,959 | A * | 9/1996 | Martin | B24D 3/004 51/295 |
| 6,354,131 | B1 * | 3/2002 | Pirchl | B21D 22/22 72/351 |
| 6,745,609 | B2 * | 6/2004 | Garnett | B21D 22/02 72/347 |
| 7,340,934 | B2 * | 3/2008 | Kurokawa | B21D 24/04 72/350 |
| 7,765,848 | B2 * | 8/2010 | Nagai | B30B 15/148 72/348 |
| 8,051,696 | B2 * | 11/2011 | Yoshida | B21D 25/02 72/347 |
| 8,584,496 | B2 * | 11/2013 | Kuwayama | B21D 37/00 72/21.4 |
| 9,011,563 | B2 * | 4/2015 | Sung | B24D 3/06 51/307 |
| 9,724,802 | B2 * | 8/2017 | Sung | B24D 3/00 |
| 9,844,809 | B2 * | 12/2017 | Xia | B21D 22/02 |
| 9,868,100 | B2 * | 1/2018 | Sung | B24B 53/017 |
| 9,931,684 | B2 * | 4/2018 | Jurich | B21D 37/10 |
| 10,786,875 | B2 * | 9/2020 | Stratton | B23K 26/38 |
| 10,946,429 | B2 * | 3/2021 | Dong | B21D 28/343 |
| 2004/0083786 | A1 * | 5/2004 | Garnett | B21D 22/02 72/348 |
| 2004/0194527 | A1 * | 10/2004 | Kurokawa | B21D 24/04 72/350 |
| 2009/0038365 | A1 * | 2/2009 | Yoshida | B21D 22/26 72/336 |
| 2010/0018280 | A1 | 1/2010 | Maeda et al. | |
| 2012/0260582 | A1 * | 10/2012 | Sung | B24D 18/0027 51/309 |
| 2014/0130564 | A1 * | 5/2014 | Suzuki | B21D 22/208 72/342.5 |
| 2015/0231688 | A1 * | 8/2015 | Yamagata | B21D 22/22 72/347 |
| 2017/0227356 | A1 | 8/2017 | Saito et al. | |
| 2018/0001369 | A1 | 1/2018 | Senda et al. | |
| 2018/0229287 | A1 * | 8/2018 | Kumagai | B21D 37/01 |

FOREIGN PATENT DOCUMENTS

| | | | | | |
|---|---|---|---|---|---|
| DE | 102006054771 | A * | 5/2008 | | B21D 37/01 |
| DE | 102012002213 | A1 * | 8/2013 | | B21D 22/22 |
| DE | 102014211233 | A1 * | 12/2015 | | B21D 22/22 |
| JP | 1-97574 | A | 4/1989 | | |
| JP | 2513078 | B2 * | 6/1992 | | |
| JP | 9-253770 | A | 9/1997 | | |
| JP | 2004-298954 | A | 10/2004 | | |
| JP | 2007-283341 | A | 11/2007 | | |
| JP | 2008-100240 | A | 5/2008 | | |
| JP | 2008100240 | A * | 5/2008 | | |
| JP | 2011-156559 | A | 8/2011 | | |
| JP | 2012-61729 | A | 3/2012 | | |
| JP | 5272245 | B2 | 8/2013 | | |
| JP | 2013-233561 | A | 11/2013 | | |
| JP | 2013233561 | A * | 11/2013 | | |
| JP | 2014176883 | A * | 9/2014 | | |
| JP | 2015-96271 | A | 5/2015 | | |
| JP | 2015199102 | A * | 11/2015 | | |
| JP | 2016-129902 | A | 7/2016 | | |
| JP | 2019018225 | A * | 2/2019 | | |
| KR | 20020051241 | A * | 6/2002 | | B21D 22/22 |
| KR | 20120110552 | A * | 10/2012 | | |
| KR | 20120110552 | A * | 10/2012 | | B21D 22/20 |
| WO | WO 2016/021685 | A1 | 2/2016 | | |
| WO | WO-2018070542 | A1 * | 4/2018 | | B21D 51/26 |

OTHER PUBLICATIONS

JP-2015199102-A machine translation (Year: 2015).*
DE-102006054771-A1 machine translation (Year: 2008).*
JP-2008100240-A machine translation (Year: 2008).*
WO-2018070542-A1 machine translation (Year: 2018).*
JP2013233561A machine translation (Year: 2013).*
JP-2513078-B2 translation (Year: 1992).*
JP-2014176883-A translation (Year: 2014).*
CN-106944545-A Machine Translation (Year: 2017).*
DE-102014211233-A1 Machine Translation (Year: 2015).*
KR20020051241A Machine Translation (Year: 2002).*
DE-102012002213-A1 Machine Translation (Year: 2013).*
KR20120110552A machine translation (Year: 2012).*
International Preliminary Report on Patentability (Form PCT/IPEA/409) for International Application No. PCT/JP2017/046459, dated May 31, 2019, with English translation.
International Search Report (Form PCT/ISA/210) for International Application No. PCT/JP2017/046459, dated Mar. 6, 2018, with English translation.
Written Opinion of the International Searching Authority (Form PCT/ISA/237) for International Application No. PCT/JP2017/046459, dated Mar. 6, 2018.
English machine translation of JP-2015-96271-A, published on May 21, 2015.
English machine translation of JP-9-253770-A, published on Sep. 30, 1997.

* cited by examiner

[Fig.1]
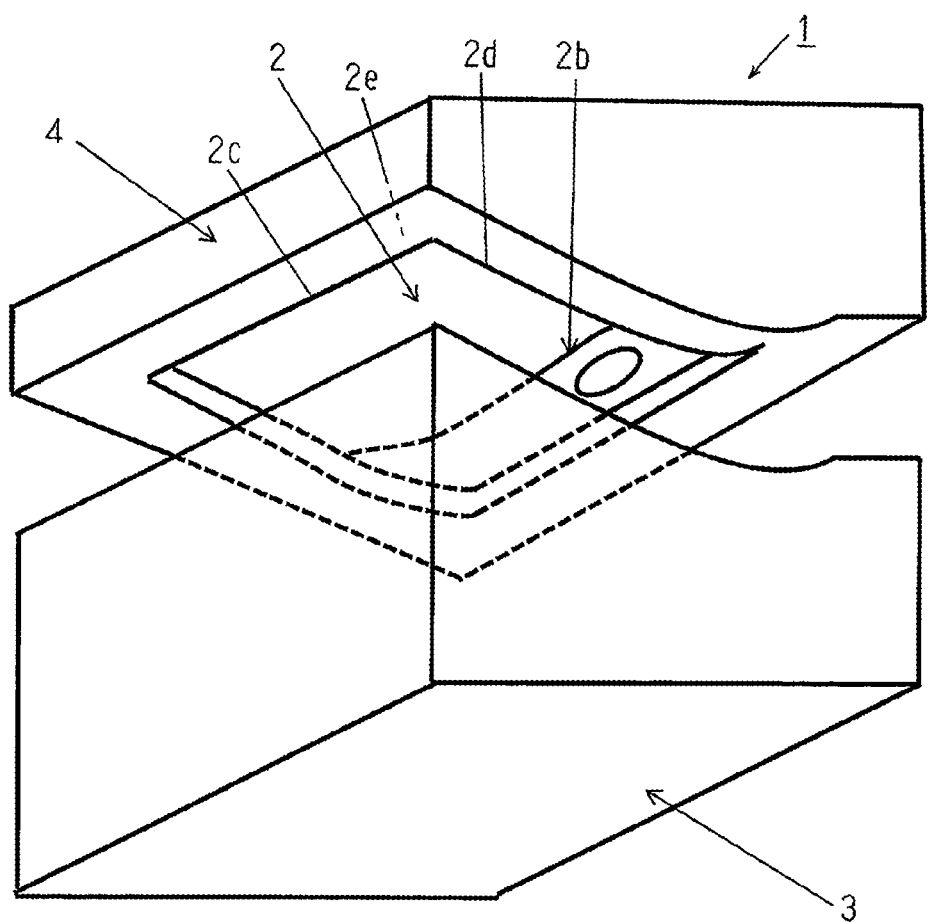

[Fig.2]
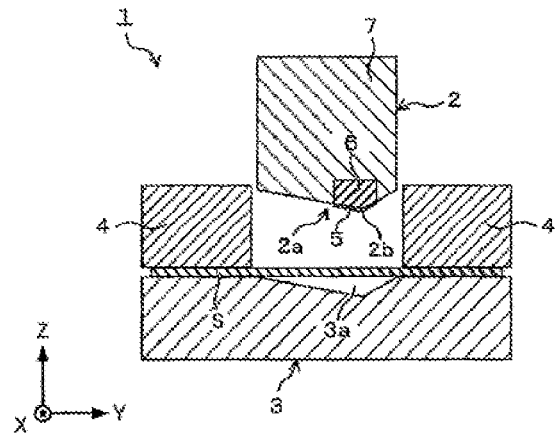
[Fig.3]
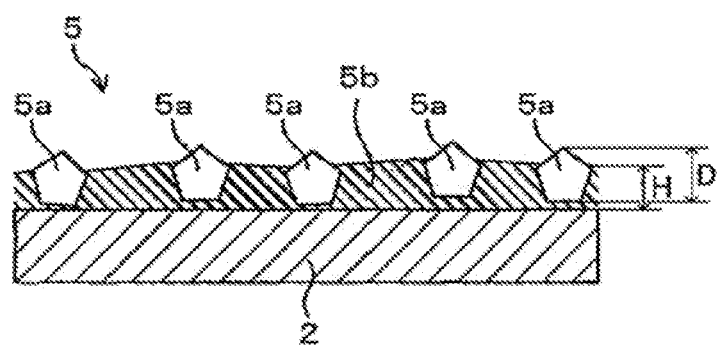
[Fig.4]
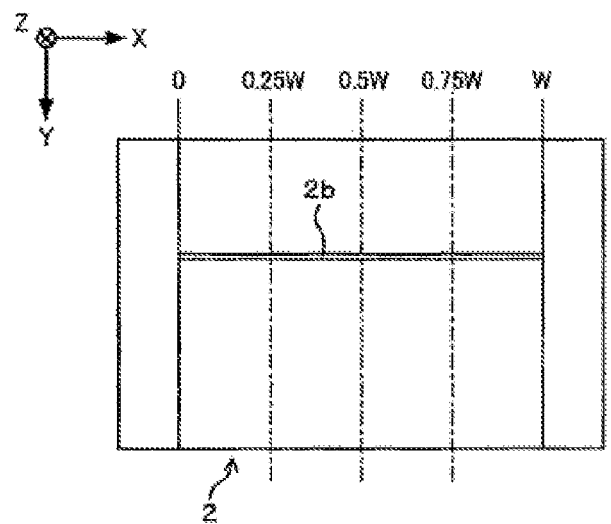

[Fig.5]
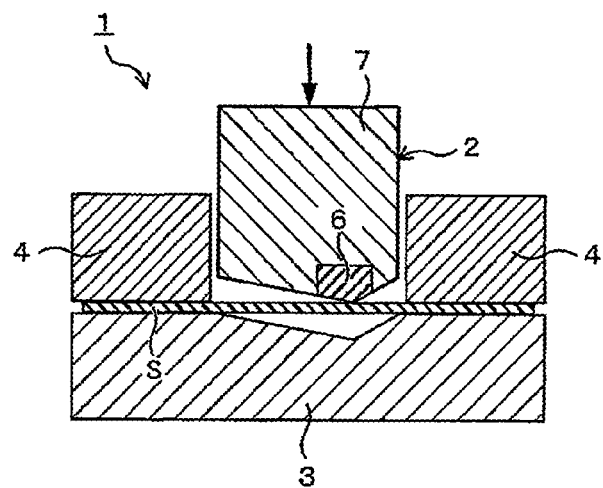
[Fig.6]
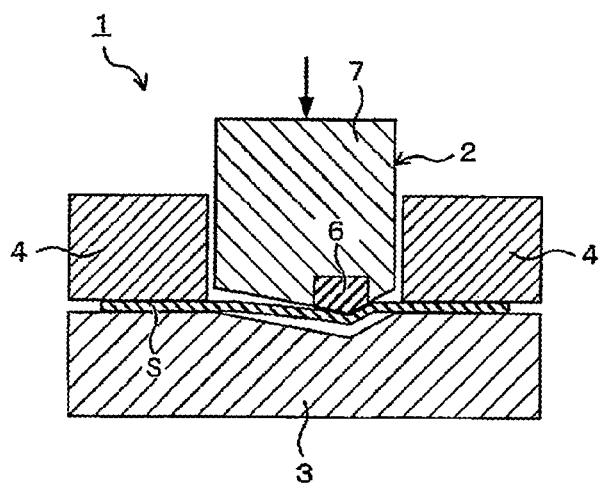

[Fig.7]
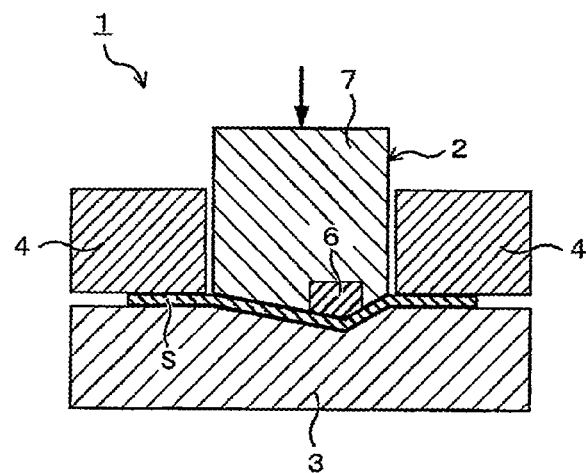
[Fig.8]
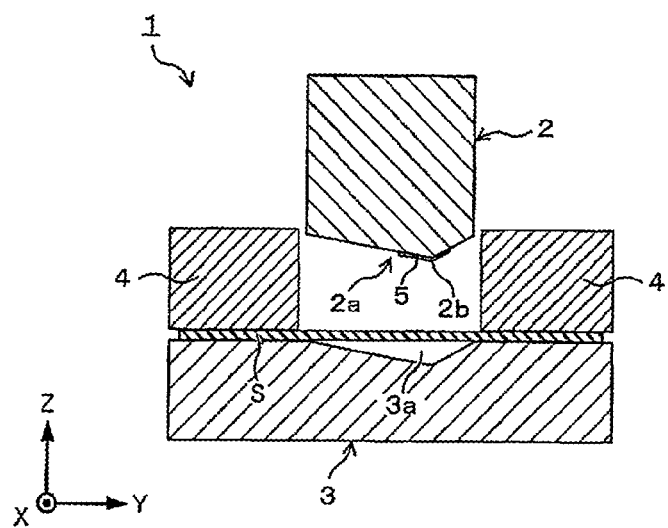

[Fig.9]
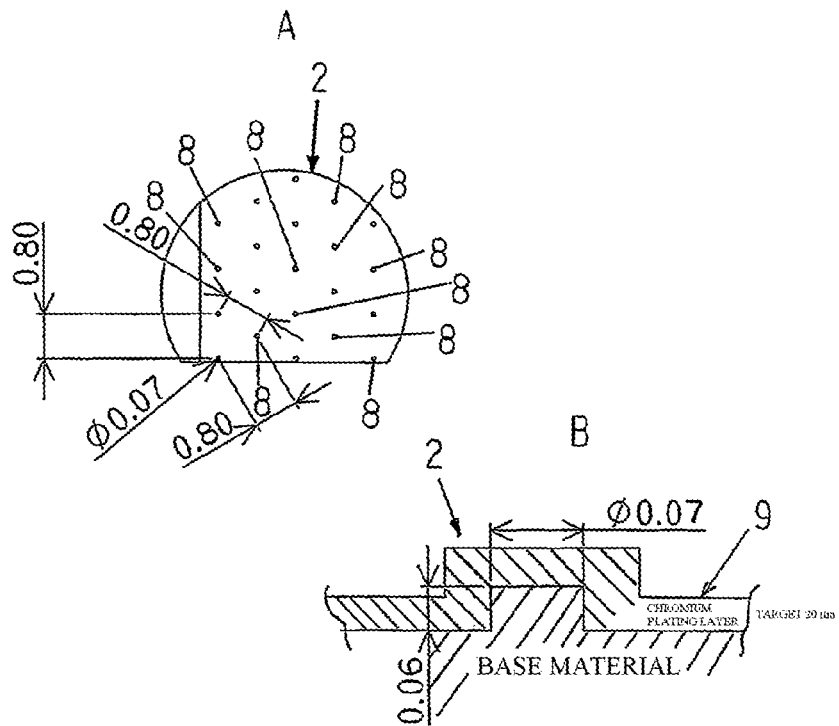
[Fig.10]
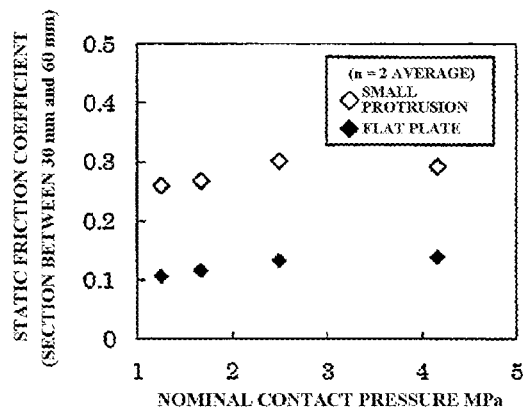

[Fig.11]
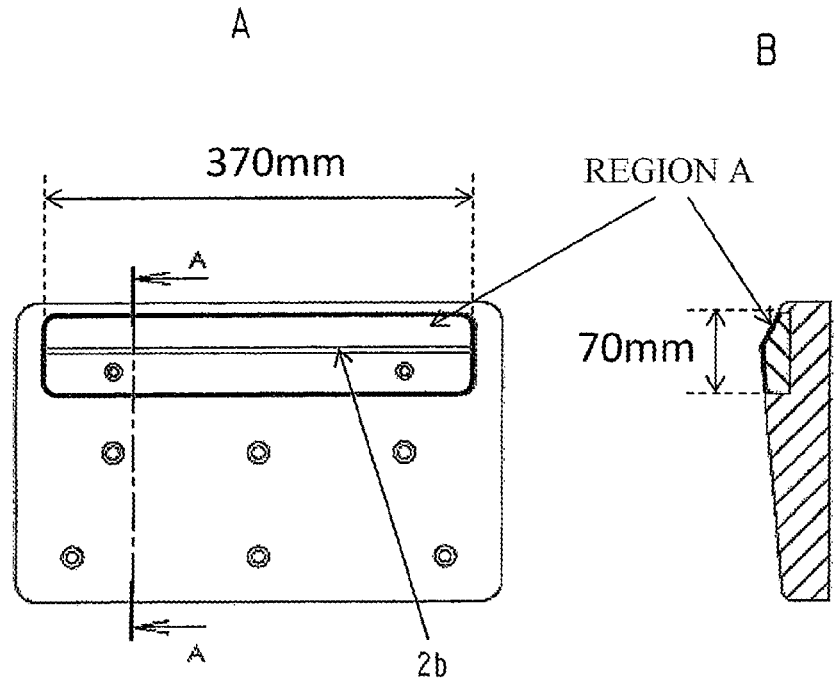
[Fig.12]
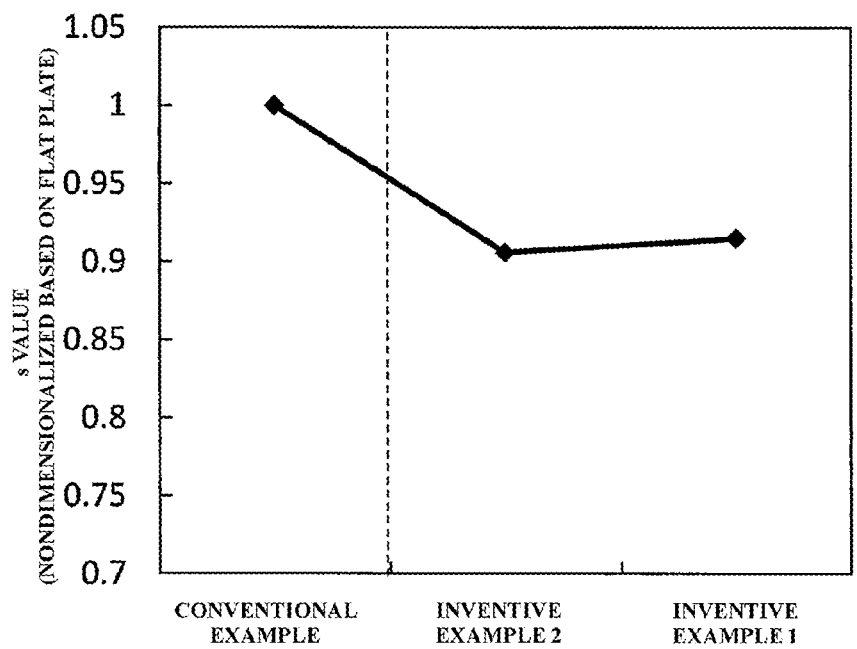

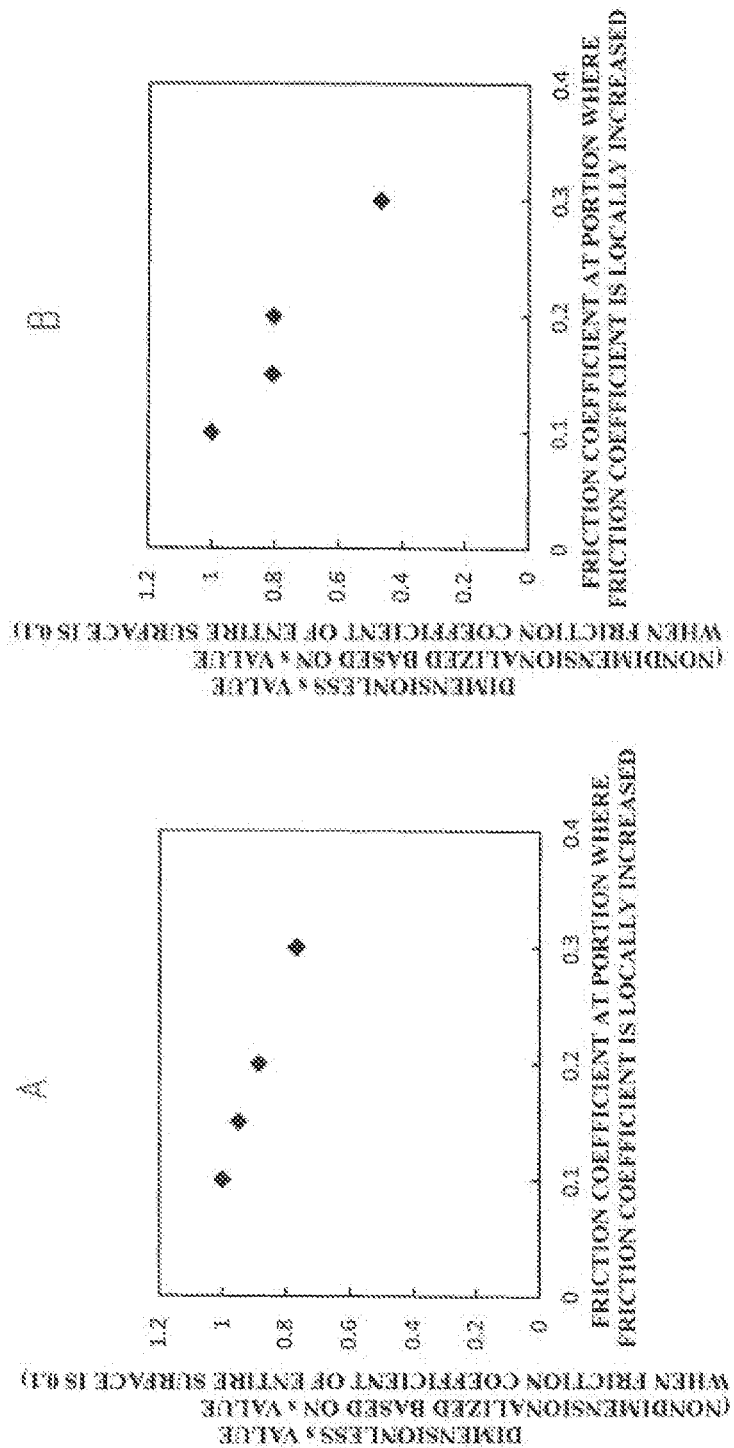

[Fig.14]
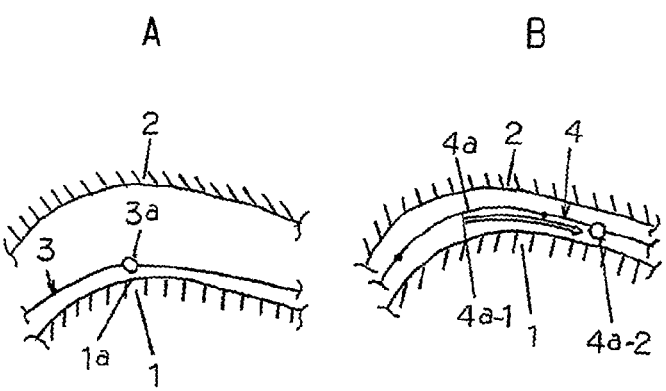

METHOD AND APPARATUS FOR PRODUCING OUTER PANEL HAVING CHARACTER LINE

TECHNICAL FIELD

The present invention relates to method and apparatus for producing an outer panel having a character line.

BACKGROUND ART

For example, a door outer panel, a fender panel, a side panel, a hood outer panel, a back door outer panel and the like are known as outer panels of a vehicle body of an automobile. In recent years, providing a sharp character line to the outer panel, particularly to the outer panel for the side surface of the vehicle body, has been adopted in many cases as one of the means for realizing exterior design having high design property.

The character line is a projecting ridge line (bent surface) formed between at least two surfaces of the outer panel. Further, the sharpness of the character line means that the radius of curvature of the bent surface is small, that is, 10 mm or less, for example, or an included angle, which is a smaller angle of two angles formed by extension surfaces of the two surfaces, is small, that is, 150° or less, for example.

It is known that providing a character line to the outer panel by performing press working by draw forming or stretch forming causes line displacement, which is quality defect on the outer surface.

FIG. 14A and FIG. 14B are cross-sectional views schematically and chronologically describing the situation where line displacement occurs. FIG. 14A shows an initial stage of forming, and FIG. 14B shows a state where the forming is completed. Two black circles in FIG. 14B indicate two ends of R portion of a character line 4a, which is a bent surface. In FIG. 14A and FIG. 14B, a blank 3 indicates a center position in the sheet thickness direction of the blank 3.

As shown in FIG. 14A and FIG. 14B, an outer panel 4 having the character line 4a is produced by performing press working on the blank 3 by draw forming or stretch forming using a punch 1, a blank holder (not shown in the drawing), and a die 2.

As shown in FIG. 14A, at the initial stage of forming, an initial bent portion (also referred to as "bending tendency") 3a, which is an extremely small local concavity, is formed at an initial striking portion on the blank where a character line forming projecting portion 1a provided to the punch 1 initially comes into contact with the blank 3. This initial bent portion 3a is a portion to be formed into the bent surface of the character line when the forming is completed.

In stretch forming or draw forming, the amount of inflow of the blank into the punch 1 and the die 2 differs depending on a portion of the blank 3. Accordingly, a difference is inevitably generated in tension which acts on each of at least two surfaces which form the character line. Due to this difference in tension, the initial bent portion 3a is moved and displaced from the projecting portion 1a with the progress of the press working. Therefore, when the forming is completed, the initial bent portion 3a remains as a concavity 4a-2 substantially extending along a portion in the vicinity of the character line 4a-1 actually formed on an outer panel 4.

As described above, line displacement is a phenomenon where the initial bent portion 3a which is formed at the initial stage of forming is moved and displaced from a position where the initial bent portion 3a should be originally positioned in the forming process, and remains also at the time when the forming is completed. When the degree of line displacement, that is, the amount of movement of the initial bent portion 3a which is formed in the forming process is large, highlight fold is found at a portion where line displacement occurs in a highlight test of the outer panel of a completed vehicle so that the outer surface is assumed as quality defect.

Line displacement is particularly liable to occur when a character line is sharp as described above. In recent years, exterior design with sharp character lines formed on the entire body has been used in many cases. Accordingly, there is a situation where line displacement is liable to occur.

Further, there is a tendency that line displacement is not liable to occur on a blank made of high strength steel having tensile strength of 440 MPa or more, whereas line displacement is liable to occur on a blank made of soft steel having tensile strength of approximately 270, 340 MPa.

For example, in stretch forming performed on a door outer panel having a character line, the height, distance and the like of material inflow preventing beads provided to a press tooling are changed according to the region of the press tooling to take a countermeasure for line displacement. However, an effect of suppressing line displacement is not sufficiently obtained.

Further, line displacement is sensuously evaluated such that an inspector visually observes a completed vehicle. Accordingly, errors are inevitably included in the inspection for line displacement. In view of the above, the applicant of the present invention has proposed a method for quantitatively evaluating line displacement in Patent Document 1.

In this method, first, distribution of curvature (second order derivative of the cross-sectional profile) is obtained based on the cross-sectional profile of the outer panel, and then the second order derivative (fourth order derivative of the cross-sectional profile) of the curvature is obtained. Then, a value H [mm$^{-3}$] at a peak of the second order derivative of the curvature which appears at a portion where a line displacement occurs, and a displacement width L [mm] between a position which corresponds to the peak and a position of an end of R portion in a designed value for the character line are obtained, and the amount of line displacement is quantitatively obtained as the evaluation parameter S=L×|H|$^{1/3}$. The results of the quantitative evaluation on the amount of line displacement using this evaluation parameter S shows a high correlation with the results of sensuous evaluation performed by an inspector.

Patent Document 2 discloses a method for forming a rear side outer panel having a character line by press forming using a punch, a split die including a first die and a second die, and a blank holder.

In this method, press forming is performed on the portion of a blank which includes the character line by the first die and the punch. Next, press forming is performed on remaining portions of the blank by the second die and the punch while maintaining a state where the formed character line is constrained by the first die and the punch. As described above, the character line is formed while line displacement is suppressed.

Patent Document 3 discloses a method for forming an outer panel having a sharp character line by press forming from a blank using a press tooling which includes a punch, a die, and a blank holder.

In this method, a lining layer formed of an elastic member is provided to a valley line portion disposed at the deepest side of a character line forming recessed portion of the die which opposes a character line forming projecting portion of the punch. A blank is subjected to forming while the lining layer is elastically deformed at a forming bottom dead center where the punch approaches closest to the die. With such a configuration, distribution of bending moment on the blank at the forming bottom dead center is reduced so that the occurrence of line displacement is suppressed.

LIST OF PRIOR ART DOCUMENTS

Patent Document

Patent Document 1: WO 2016/021685
Patent Document 2: JP2008-100240A
Patent Document 3: JP2015-96271A

SUMMARY OF INVENTION

Technical Problem

In the invention disclosed in Patent Document 2, when a force which constrains the character line using the second die is increased, the movement of the blank is suppressed in forming a portion other than the character line. Accordingly, deflection or insufficient inflow occurs on the blank at the portion other than the character line so that forming defects are liable to occur. The forming defects are liable to occur particularly in forming a character line having a shape which is three-dimensionally curved.

In the invention disclosed in Patent Document 2, it is necessary to use the split die which includes the first die and the second die, thus increasing the cost of press tooling.

Further, in the invention disclosed in Patent Document 2, there is a possibility that a split line (split surface) between the first die and the second die appears on the surface of the rear side outer panel subjected to forming. Accordingly, there is a concern of the occurrence of quality defects on the outer surface different from quality defects on the outer surface attributable to line displacement.

In the invention disclosed in Patent Document 3, the lining layer provided at the valley line portion disposed at the deepest side of the character line forming recessed portion of the die is elastically deformed at the forming bottom dead center to suppress the occurrence of line displacement. Accordingly, the movement of the initial bent portion at the forming bottom dead center and a portion in the vicinity of the forming bottom dead center can actually be suppressed. However, it is impossible to suppress the movement of the initial bent portion at a portion other than the forming bottom dead center and the portion in the vicinity of the forming bottom dead center, that is, the movement of the initial bent portion in the forming process. Accordingly, an effect of suppressing line displacement cannot be sufficiently obtained.

An objective of the present invention, which has been made in view of such problems of the prior art, is to suppress or substantially eliminate line displacement without a significant increase in cost of press tooling and forming defects in producing an outer panel having a character line by press working.

Solution to Problem

To suppress line displacement, it is effective (i) to eliminate the generated initial bent portion, and (ii) to prevent the generated initial bent portion from moving in the forming process. The inventors of the present invention have made extensive studies in view of such points and, as a result, obtained the findings A to D enumerated below with respect to (ii), leading to the achievement of the present invention.

(A) The punch used for draw forming or stretch forming includes a high contact pressure generating portion which applies a high contact pressure to the blank during a period from the start of the forming to the completion of the forming, and a low contact pressure generating portion, which applies, to the blank during the period from the start of the forming to the completion of the forming, a contact pressure lower than the contact pressure applied to the blank by the high contact pressure generating portion.

For example, the character line forming projecting portion and the punch shoulder R portion are the high contact pressure generating portions, while the punch top portion and a punch vertical wall portion, excluding the character line forming projecting portion and the punch shoulder R portion, are the low contact pressure generating portions.

By partially increasing a static friction coefficient of the high contact pressure generating portion of the punch and a region around the high contact pressure generating portion with respect to the blank, a frictional force between such a region of the punch and the blank increases during press forming. Accordingly, the initial bent portion is prevented from easily moving in the forming process of the character line.

For example, increasing a static friction coefficient of the character line forming projecting portion of the punch with respect to the blank can suppress the movement of a portion in the vicinity of the initial bent portion. Further, increasing a static friction coefficient of the punch shoulder R portion with respect to the blank can suppress the movement of the entire blank including the initial bent portion.

Accordingly, the occurrence of line displacement on the outer panel having the character line can be suppressed or substantially eliminated.

(B) As a means for increasing the static friction coefficient of the high contact pressure generating portion of the punch and the region around the high contact pressure generating portion with respect to the blank, the following (B1) and (B2) are exemplified.

(B1) To provide particles having Vickers hardness of 700 HV or more in the high contact pressure generating portion of the punch and the region around the high contact pressure generating portion.

(B2) To provide protrusions by an appropriate means in the high contact pressure generating portion of the punch and the region around the high contact pressure generating portion.

(C) The means exemplified in (B1) and (B2) are performed on the punch which comes into contact with the inner surface of the outer panel which is a non-design surface to prevent impairing of the design property (aesthetics) of the outer surface of the outer panel subjected to forming.

(D) During the press forming, the character line forming portion of the blank is not firmly constrained by the punch and the die. For this reason, the occurrence of forming defects, such as deflection of blank or insufficient inflow, are prevented at a portion other than the character line.

The present invention is as enumerated below.

(1) A method for producing an outer panel having a character line, which is a bent surface between two surfaces, by using a punch and a blank holder, and a die which opposes the punch and the blank holder, to perform press working on a blank disposed between the punch and the blank holder on one side and the die on the other side by draw forming or stretch forming, wherein the punch includes a projecting portion for forming the bent surface and a punch shoulder R portion at a punch top portion, a contact pressure applied to the blank by at least one of the projecting portion and the punch shoulder R portion during the press working is higher than a contact pressure applied to the blank by a remaining portion of the punch which excludes the projecting portion and the punch shoulder R portion during the press working, and a static friction coefficient of a first portion of the punch which includes at least one of the projecting portion and the punch shoulder R portion with respect to the blank is larger than a static friction coefficient of a second portion of the punch which excludes the first portion with respect to the blank.

(2) The method for producing an outer panel having a character line according to 1, wherein a difference between the static friction coefficient of the first portion with respect to the blank and the static friction coefficient of the second portion with respect to the blank is 0.05 or more.

(3) The method for producing an outer panel having a character line according to 1 or 2, wherein the static friction coefficient is a static friction coefficient in a direction along which a concavity generated on the blank due to an initial strike of the projecting portion on the blank moves in a forming process.

(4) The method for producing an outer panel having a character line according to any one of 1 to 3, wherein at least one of the projecting portion and the punch shoulder R portion includes particles having Vickers hardness of 700 HV or more.

(5) The method for producing an outer panel having a character line according to 4, wherein the punch includes a particle fixing portion having a holding layer which holds the particles, and the particle fixing portion is provided to at least one of the projecting portion and the punch shoulder R portion.

(6) The method for producing an outer panel having a character line according to 4 or 5, wherein an embedding ratio of the particles is 50 to 80%.

Wherein the embedding ratio is calculated as (a height of the holding layer/an average particle size of the particles)× 100(%).

(7) The method for producing an outer panel having a character line according to 6, wherein the average particle size of the particles is 5 to 600 μm.

(8) The method for producing an outer panel having a character line according to 6 or 7, wherein a particle ratio of the particles fixed is 5 to 20%.

Wherein the particle ratio is calculated as (a total volume of the particles/a volume of the particle fixing portion)×100 (%).

(9) The method for producing an outer panel having a character line according to any one of 5 to 8, wherein the particle fixing portion is exchanged with another particle fixing portion according to an operating condition.

(10) The method for producing an outer panel having a character line according to any one of 4 to 9, wherein the particles come into contact with a non-design surface of the blank which is an inner surface of the outer panel.

(11) The method for producing an outer panel having a character line according to any one of 1 to 3, wherein at least one of the projecting portion and the punch shoulder R portion includes a protrusion.

(12) The method for producing an outer panel having a character line according to 11, wherein a height of the protrusion is 0.02 to 0.10 mm.

(13) The method for producing an outer panel having a character line according to 11 or 12, wherein the protrusion comes into contact with a non-design surface of the blank which is an inner surface of the outer panel.

(14) An apparatus for producing an outer panel having a character line, which is a bent surface between at least two surfaces, the apparatus including: a punch and a blank holder; and a die which opposes the punch and the blank holder, the outer panel being produced by performing press working on a blank disposed between the punch and the blank holder on one side and the die on the other side by draw forming or stretch forming, wherein the punch includes a projecting portion for forming the bent surface and a punch shoulder R portion at a punch top portion, a contact pressure applied to the blank by at least one of the projecting portion and the punch shoulder R portion during the press working is higher than a contact pressure applied to the blank by a remaining portion of the punch which excludes the projecting portion and the punch shoulder R portion during the press working, and a static friction coefficient of a first portion of the punch which includes at least one of the projecting portion and the punch shoulder R portion with respect to the blank is larger than a static friction coefficient of a second portion of the punch which excludes the first portion with respect to the blank.

Advantageous Effects of Invention

According to the present invention, in producing an outer panel having a character line, particularly a sharp character line, by press working, line displacement can be suppressed or substantially eliminated while the occurrence of forming defects is suppressed without a significant increase in cost of press tooling.

BRIEF DESCRIPTION OF DRAWINGS

FIG. 1 is an exploded perspective view showing one example of a production apparatus before forming is started.

FIG. 2 is a cross-sectional view showing the configuration of the production apparatus of an embodiment 1.

FIG. 3 is an enlarged view of a particle fixing portion provided to a punch top portion.

FIG. 4 is an explanatory view showing a situation of a punch as viewed from below.

FIG. 5 is an explanatory view showing the action of a production apparatus 1.

FIG. 6 is an explanatory view showing the action of the production apparatus 1.

FIG. 7 is an explanatory view showing the action of the production apparatus 1.

FIG. 8 is a cross-sectional view schematically showing the configuration of the production apparatus 1 of another mode.

FIG. 9A is an explanatory view showing the arrangement of a plurality of protrusions provided, and FIG. 9B is an explanatory view showing the dimensions of the protrusions.

FIG. 10 is a graph showing the relationship between a nominal contact pressure and a friction coefficient which changes depending on the presence or absence of the protrusions.

FIG. 11A is a plan view showing a region A where particles are provided in an example 1, and FIG. 11B is an A-A cross-sectional view of FIG. 11A.

FIG. 12 is a graph showing the results of the example 1.

FIG. 13 is a graph showing the results of an example 2.

FIG. 14A and FIG. 14B are cross-sectional views schematically describing the situation where line displacement occurs.

DESCRIPTION OF EMBODIMENTS

The present invention will be described. In the description made hereinafter, the case where an outer panel is a door outer panel is taken as an example. The present invention is not limited to the door outer panel, and is also similarly applicable to outer panels, such as a fender panel, a side panel, a hood outer panel, or a back door outer panel, for example.

FIG. 1 is an exploded perspective view showing one example of a production apparatus 1 before forming is started.

As shown in FIG. 1, the production apparatus 1 includes a punch 2, a blank holder 4, and a die 3.

The die 3 is disposed to oppose the punch 2 and the blank holder 4. The punch 2, the blank holder 4, and the die 3 perform press working on a blank (not shown in the drawing) disposed between the punch 2 and the blank holder 4 on one side and the die 3 on the other side by draw forming or stretch forming, thus producing a door outer panel (not shown in the drawing).

The case is exemplified where the blank is a blank made of metal, and is a steel sheet. The blank is not limited to a steel sheet, and may be an industrial pure aluminum sheet, an aluminum alloy sheet, an industrial pure titanium sheet, a titanium alloy sheet or other sheets.

The door outer panel includes a character line which is a bent surface (ridge line) between at least two surfaces. The door outer panel may include a plurality of character lines.

As the character line, exemplified is a sharp character line having the radius of curvature of the ridge line of 10 mm or less in a cross section orthogonal to the character line, or a sharp character line where an included angle, which is the smaller angle of two angles formed by two surfaces obtained by extending two surfaces forming the ridge line in a cross section orthogonal to the character line, is 150° or less. In the case of these sharp character lines, line displacement is liable to occur during press forming and hence, the effect of the present invention can be effectively obtained.

The punch 2 includes a high contact pressure generating portion. The high contact pressure generating portion applies a high contact pressure to the blank during a period from the start of the forming of the blank to the completion of the forming of the blank. For example, at least one of a character line forming projecting portion 2b and a punch shoulder R portion 2c is the high contact pressure generating portion. The punch 2 may include a plurality of projecting portions 2b.

The punch 2 includes low contact pressure generating portions. The low contact pressure generating portions are portions of the punch 2 excluding the high contact pressure generating portion, and are a remaining portion 2d of a punch top portion 2a which excludes the projecting portion 2b and the punch shoulder R portion 2c, and a punch vertical wall portion 2e. The low contact pressure generating portions apply, to the blank, a contact pressure lower than the contact pressure which the high contact pressure generating portion 10 applies to the blank during a period from the start of the forming of the blank to the completion of the forming of the blank.

In the production apparatus 1, the static friction coefficient μ1 of a first portion of the punch 2 which includes at least one of the projecting portion 2b and the punch shoulder R portion 2c with respect to the blank is larger than the static friction coefficient μ2 of a second portion of the punch 2 which excludes the first portion with respect to the blank.

Such a configuration increases a frictional force which is generated between the first portion and the blank. Accordingly, the first portion can suppress that an initial bent portion, which is generated on the blank due to initial striking of the punch 2, is moved and displaced from the position where the initial bent portion should be originally positioned in the forming process and hence, line displacement on the door outer panel can be suppressed or substantially eliminated.

Specifically, in the case where a static friction coefficient of the projecting portion 2b is increased, an effect of suppressing line displacement appears not only a point of time when the punch reaches the forming bottom dead center, but also during a period from the initial striking to the reaching to the forming bottom dead center. Further, a contact pressure applied to the punch shoulder R portion 2c is higher than a contact pressure on the character line forming projecting portion 2b. Accordingly, when the static friction coefficient of the punch shoulder R portion 2c is increased, at the point of time when the punch reaches the forming bottom dead center, a greater effect of suppressing line displacement can be obtained than the prior art.

Accordingly, although it is sufficient to increase at least the static friction coefficient μ1 of at least one of the projecting portion 2b and the punch shoulder R portion 2c, the static friction coefficient μ1 may be increased for an additional region in the vicinity of at least one of the projecting portion 2b and the punch shoulder R portion 2c.

For example, in the case of (a) the projecting portion 2b, the static friction coefficient μ1 may be increased for a region within 100 mm inclusive from the character line or a region where a contact pressure during the forming becomes 2 MPa or more. In the case of (b) the punch shoulder R portion 2c, the static friction coefficient μ1 may be increased for a region where a contact pressure during the forming becomes 2 MPa or more.

A difference between the static friction coefficient μ1 of the first portion with respect to the blank and the static friction coefficient μ2 of the second portion with respect to the blank is preferably set to 0.05 or more, more preferably set to 0.10 or more, and further preferably set to 0.15 or more. With such a configuration, it is possible to suppress line displacement on an outer panel having a character line with certainty.

When the static friction coefficients μ1, μ2 of the first portion and the second portion are static friction coefficients in a direction along which the initial bent portion (concavity), generated on the blank due to the initial strike of the projecting portion 2b to blank, moves in a forming process, it is possible to reduce a region where the static friction coefficient μ1 is required to be increased, thus suppressing an increase in manufacturing cost of the punch 2. Accordingly, such a configuration is preferable.

Next, means 1, 2 for increasing the static friction coefficient μ1 of the first portion with respect to the blank will be described.

(Means 1)

FIG. 2 is a cross-sectional view showing the configuration of the production apparatus 1. In the description made hereinafter with respect to the means 1, the case where particles are provided to the projecting portion 2b of the punch 2 is taken as an example. However, the same situation arises also in the case where particles are provided to the punch shoulder R portion 2c of the punch 2.

The production apparatus 1 includes the punch 2 as an upper die, and includes the die 3 as a lower die which opposes the punch 2. The production apparatus 1 includes the blank holder 4, which press a blank S, on the side of the punch 2 and above the die 3. The punch 2 is elevatably supported by an elevating mechanism not shown in the drawing.

FIG. 3 is an enlarged view of a particle fixing portion 5 provided to the punch top portion 2a. In FIG. 3, the size of the particle fixing portion 5 is exaggerated with respect to the punch 2 to facilitate the understanding of the function of the particle fixing portion 5.

As shown in FIG. 3, the particle fixing portion 5 includes particles 5a and a holding layer 5b which causes the particles 5a to be fixed to the punch 2. As shown in FIG. 2, the particle fixing portion 5 has a projecting shape which conforms to the shape of the punch top portion 2a in the state of being provided to the punch 2.

FIG. 4 is an explanatory view showing the situation of the punch 2 as viewed from below.

As shown in FIG. 4, the punch 2 has a shape which extends along the X direction in FIGS. 2, 4. The particle fixing portion 5 also has a shape which extends along the X direction in FIGS. 2, 4 in conformity with the shape of the punch top portion 2a.

The particle fixing portion 5 is provided to form the projecting portion 2b provided to the punch top portion 2a. The position of the projecting portion 2b agrees with a position where a character line is formed on a door outer panel, which is a product.

Meanwhile, a die recessed portion 3a which conforms to the shape of the punch top portion 2a of the punch 2 is provided on the upper surface of the die 3. The position of the lowermost end of the die recessed portion 3a agrees with the position where the character line is formed on the door outer panel, which is the product.

When the punch top portion 2a comes into contact with the blank S, an initial bent portion is formed. Then, the punch top portion 2a and the die recessed portion 3a form the character line on the door outer panel.

The shapes of the punch 2 and the die 3 are not limited to the shapes shown in FIGS. 1 to 4, and may be changed as needed according to the shape of a door outer panel to be produced. For example, the production apparatus 1 shown in FIGS. 1 to 4 forms one character line. However, in the case where a plurality of character lines are formed, a plurality of character line forming projecting portions 2b of the punch top portion 2a and a plurality of lowermost ends of the die recessed portion 3a are provided.

FIGS. 5 to 7 are explanatory views chronologically showing the action of the production apparatus 1 of the embodiment. In FIGS. 5 to 7, the particle fixing portion 5 is omitted.

With respect to the punch 2, a part of the punch 2 which corresponds to a portion provided with the particle fixing portion 5 (hereinafter, referred to as "punch detachable portion 6") is detachably mounted on a punch body 7.

The particle fixing portion 5 is provided to the surface of the punch detachable portion 6 which is detachable with respect to the punch body 7. Accordingly, the particle fixing portion 5 is detachably disposed on the punch 2 by attaching/detaching of the punch detachable portion 6.

The punch 2 is formed of the punch detachable portion 6 and the punch body 7. Accordingly, depending on operating conditions, such as the wear state of the particles 5a on the particle fixing portion 5, hardness of the blank S and the shape of the character line, the punch detachable portion 6 can be easily exchanged with another punch detachable portion 6 provided with the particle fixing portion 5 or another punch detachable portion 6 including a particle fixing portion with different kind of particles, for example.

With such a configuration, a time for exchange can be significantly shortened compared with the case where the punch 2 per se is exchanged and hence, productivity can be enhanced. Note that the configuration where the particle fixing portion 5 is detachable with respect to the punch 2 is not limited to the above-described mode.

It is sufficient for the particles 5a on the particle fixing portion 5 to have Vickers hardness of 700 HV or more, and the particles 5a are not particularly limited. With the provision of the particle fixing portion 5 to the punch 2, it is possible to increase a frictional force generated between the punch 2 and the blank S during press forming compared with the case where press forming is performed using a punch provided with no particle fixing portion 5.

With the increase in frictional force, it is possible to suppress the movement of a material at a character line forming portion on the blank S. Accordingly, the amount of movement of an initial bent portion formed at the initial stage of press forming reduces so that line displacement of the character line can be suppressed or substantially eliminated.

When Vickers hardness of the particles 5a is less than 700 HV, the particles 5a cannot easily bite into the blank S during press forming so that a frictional force between the punch 2 and the blank S is insufficient. For this reason, Vickers hardness of the particles 5a is set to 700 HV or more, preferably set to 1500 HV or more, and further preferably set to 2000 HV or more.

The particles 5a are appropriately selected according to hardness of the blank S. For example, fused alumina (2100 HV), silicon carbide (25000 HV), boron carbide (2750 HV), ceramic (2800 HV), diamond (9000 HV) or the like is used as the particles 5a.

The particles 5a are fixed to the surface of the punch detachable portion 6 via the holding layer 5b. A method for fixing the particles 5a is not particularly limited, and may be electrodeposition coating, welding or the like. In performing electrodeposition coating, the punch detachable portion 6 is immersed into a liquid layer containing the particles 5a, and a voltage is applied to the immersed portion of the punch detachable portion 6.

In the case where the particles 5a are welded, metal plating is applied to the surface of the particles 5a, and the particles 5a are directly brazed to the surface of the punch detachable portion 6. In this case, filler metal plays a role of the holding layer 5b.

The width of the particle fixing portion 5 (width in the Y direction in FIGS. 2, 4) may be appropriately determined according to the kind or hardness of the particle, an embedding ratio, the kind of steel or hardness of the blank S, the shape of the character line and the like such that line displacement is suppressed by a frictional force between the punch 2 and the blank S.

<Embedding Ratio>

The embedding ratio of the particles 5a in the particle fixing portion 5 is preferably set to 50 to 80%. This embedding ratio is a ratio of the height H of the holding layer 5b to the average particle size D of the particles 5a, and is calculated as (height H of holding layer 5b/average particle size D of particles 5a)×100(%). The embedding ratio is an index indicating the height of the portion of the particles 5a protruding from the holding layer 5b.

When the embedding ratio is less than 50%, the portion of the particles 5a protruding from the holding layer 5b have the large height so that a frictional force between the punch 2 and the blank S is enhanced. However, an input load to the individual particle 5a is increased.

Accordingly, the particles 5a are liable to drop off the holding layer 5b and, further, the particles 5a are liable to wear. For this reason, to enhance wear resistance of the particle fixing portion 5, an embedding ratio is preferably set to 50% or more, more preferably set to 55% or more, and further preferably set to 60% or more.

To the contrary, when the embedding ratio exceeds 80%, the number of particles 5a which are buried in the holding layer 5b increases and hence, a frictional force between the particle fixing portion 5 and the blank S cannot be sufficiently increased. For this reason, the embedding ratio is preferably set to 80% or less, more preferably set to 75% or less, and further preferably set to 70% or less.

A method for measuring the height H of the holding layer 5b will be described. With respect to the punch 2 as viewed in a plan view in FIG. 4, the entire length of the projecting portion 2b is assumed as "W", the starting end position of the projecting portion 2b is assumed as "0", and the finishing end position of the projecting portion 2b is assumed as "W". Under such conditions, a range of ±2.0 mm from each of a 0.25 W position, a 0.50 W position and a 0.75 W position in the extending direction of the projecting portion (the X direction in FIG. 4) is set as an observation position.

Optical microscope specimens of cross sections perpendicular to the projecting portion 2b are prepared with respect to these observation positions, and observation is performed on the cross section of each observation position (for a range of ±2.0 mm in the extending direction of the projecting portion) at the 0.25 W position, the 0.50 W position, and the 0.75 W position. The height of the holding layer 5b (the direction perpendicular to the surface of the punch) is measured at 20 points in each observation position, and the average value of 60 points in total is obtained to give the height of the holding layer 5b.

Next, a method for measuring the average particle size of the particles 5a will be described. With respect to the punch 2 as viewed in a plan view in FIG. 4, the entire length of the projecting portion 2b is assumed as "W", the starting end position of the projecting portion 2b is assumed as "0", and the finishing end position of the projecting portion 2b is assumed as "W". Assuming the above, at positions −2 mm, −1 mm, 0 mm, 1 mm, and 2 mm from each of the 0.25 W position, the 0.50 W position and the 0.75 W position in the extending direction of the projecting portion (the X direction in FIG. 4), optical microscope specimens of cross sections perpendicular to the projecting portion 2b are prepared, and are observed using an optical microscope with 100 to 400 times field.

The average value of the particle sizes of the particles 5a on cross sections at these 15 observation positions is assumed as the average particle size of the particles 5a. With respect to the particle size of the individual particle 5a, an average value of a long side and a short side of the particle 5a is defined as a particle size. The particle size of the particle 5a which overlaps with the observation position is not measured, thus not included as a value.

FIG. 4 shows the case where the projecting portion 2b has a straight line as viewed in a plan view. However, the projecting portion 2b may have a three-dimensional curve.

<Average Particle Size>

The average particle size of the particles 5a is preferably set to 5 to 600 μm. When the average particle size of the particles 5a is less than 5 μm, there is a concern that the frictional force between the punch 2 and the blank S may be insufficient depending on the operating conditions, such as a difference in hardness between the particles 5a and the blank S or the shape of a character line. For this reason, the average particle size of the particles 5a is preferably set to 5 μm or more, more preferably set to 10 μm or more, and further preferably set to 50 μm or more.

To the contrary, when the average particle size of the particles 5a exceeds 600 μm, there is a concern that, depending on operating conditions, such as a difference in hardness between the particles 5a and the blank S and the shape of a character line, an input load to the respective particles 5a on the particle fixing portion 5 becomes excessively large during press forming of the blank S so that the particles 5a are liable to drop off the holding layer 5b. For this reason, the average particle size of the particles 5a is preferably set to 600 μm or less, more preferably set to 500 μm or less, and further preferably set to 400 μm or less.

Note that, in the punch 2 shown in FIG. 4, the projecting portion 2b extends along the X direction in a straight line manner so that cross sections on which particle sizes are measured extend parallel to each other. However, for example, when the projecting portion 2b has a curved shape or a shape which curves three-dimensionally, the cross section at the 0.25 W position, the cross section at the 0.50 W position, and the cross section at the 0.75 W position may intersect with each other.

<Particle Ratio>

The particle ratio in the particle fixing portion 5 is preferably set to 5 to 20%. The particle ratio is a ratio forming an index indicating the degree of density of particles in a fixed region, and is calculated as (total volume of particles 5a in particle fixing portion 5/volume of particle fixing portion 5)×100(%).

When the particle ratio is less than 5%, the number of particles 5a is excessively small and hence, there is a concern that a frictional force between the punch 2 and the blank S is insufficient depending on operating conditions, such as a difference in hardness between the particles 5a and the blank S or the shape of a character line. For this reason, the particle ratio in the particle fixing portion 5 is preferably set to 5% or more, more preferably set to 8% or more, and further preferably set to 10% or more.

To the contrary, when the particle ratio exceeds 20%, the number of particles 5a in the particle fixing portion 5 is excessively large and hence, there is a concern that clogging is liable to occur between the particles 5a depending on operating conditions, such as a difference in hardness between the particles 5a and the blank S or the shape of a character line. When clogging occurs between the respective particles 5a, a frictional force between the punch 2 and the blank S becomes insufficient. For this reason, the particle ratio in the particle fixing portion 5 is preferably set to 20% or less, more preferably set to 15% or less, and further preferably set to 10% or less.

The production apparatus 1 is formed as described above. Next, a method for producing an outer panel having a character line using the production apparatus 1 will be described.

First, the blank S is disposed between the die 3 and a blank holder 4. At this point of operation, the blank S is disposed such that, of the surface of the blank S forming the external appearance (design surface) and the surface of the blank S not forming the external appearance (non-design surface), the non-design surface side is directed to the punch 2 side.

Next, the punch 2 is lowered. At this point of operation, the projecting portion 2b of the punch 2 comes into contact with the blank S first so that an initial bent portion which becomes the cause of line displacement is generated on the blank S. FIG. 5 shows a state where the projecting portion 2b comes into contact with the blank S first.

Thereafter, as shown in FIG. 6, the punch 2 is further lowered. With such an operation, the punch 2 is lowered while maintaining a state where the particle fixing portion 5, which is provided to cover the projecting portion 2b, is in contact with the blank S. Accordingly, the particles 5a on the particle fixing portion 5 bite into the blank S.

Accordingly, a frictional force between the particle fixing portion 5 and the blank S becomes higher than a frictional force obtained in the case of using a conventional punch having no particle fixing portion 5. The punch 2 is lowered in such a state.

Therefore, the movement of a material at the character line forming portion on the blank S is suppressed. As a result, the initial bent portion formed at the initial stage of press forming cannot easily move and hence, the line displacement of the character line is suppressed.

The punch 2 is moved to the forming bottom dead center as shown in FIG. 7 in such a state to form a character line on the blank S. The particle fixing portion 5 of the punch 2 comes into contact with the non-design surface of the blank S and hence, eaves formed due to the contact with the particles 5a do not appear on the external appearance of a product.

As described above, according to the production apparatus 1, compared with the prior art, it is possible to suppress line displacement which is determined as quality defect on the outer surface of the door outer panel in a highlight test for a completed vehicle.

Further, the particles 5a are fixed only on the punch 2, and the particles 5a are not provided to the die 3. Accordingly, a large constraining force which completely constrains the character line forming portion on the blank S is not generated during press forming.

With such a configuration, forming defect, such as deflection of the blank or insufficient inflow, is not liable to occur during press forming for a portion other than the character line forming portion. Accordingly, it is also possible to produce an outer panel which includes a character line having a shape which curves three-dimensionally, such as a door outer panel.

FIG. 8 is a cross-sectional view schematically showing the configuration of the production apparatus 1 of another mode.

In the description made heretofore, the mode is exemplified where the punch 2 is formed of the punch detachable portion 6 and the punch body 7. However, as shown in FIG. 8, the punch detachable portion 6 and the punch body 7 may be formed as an integral body. In the production apparatus 1, for example, the particle fixing portion 5 may be formed such that the holding layer 5b is attached by adhesion to, or is applied by coating on the surface of the punch top portion 2a, thus causing the particles 5a to be fixed to the holding layer 5b in a dispersed manner.

(Means 2)

Next, the means 2 will be described. A point which makes the means 2 different from the means 1 is that protrusions 8 are used in place of the particles 5a of the means 1 as the means for increasing a static friction coefficient μ1 of the first portion with respect to the blank.

The plurality of protrusions 8 are provided to the first portion of the punch 2. FIG. 9A is an explanatory view showing one example of the arrangement of the plurality of protrusions 8 provided, and FIG. 9B is an explanatory view showing one example of the dimension of the protrusion 8. Note that a unit of the dimension in FIG. 9A and FIG. 9B is "mm".

The plurality of protrusions 8 may be formed by any means. However, to suppress an increase in manufacturing cost of the punch, for example, it is desirable to form the plurality of protrusions 8 by etching in a state where a normal punch is masked.

As shown in FIG. 9A, the plurality of protrusions 8 are provided at the first portion in a grid pattern with a center distance of 0.80 mm. Further, as shown in FIG. 9B, a chromium plating layer 9 having a target thickness of 20 μm is formed on the protrusions 8 formed at the first portion. The target value of the height of the protrusion 8 is 0.06 mm, and the target value of the diameter of the protrusion 8 is 0.11 mm. The chromium plating layer 9 increases hardness of the protrusion 8.

These protrusions 8 are provided to the first portion of the punch 2 such that the protrusions 8 come into contact with the inner surface of the blank S which is the non-design surface of the door outer panel. With such a configuration, line displacement on the door outer panel can be suppressed while the lowering of quality of the external appearance of the outer surface, which is the design surface of the door outer panel, is prevented.

As exemplified in FIG. 9A and FIG. 9B, it is desirable that the protrusion 8 satisfies a height of 0.02 to 0.10 mm, a diameter of 0.05 to 0.15 mm, a density of $5 \times 10^5$ to $5 \times 10^6$ pieces/m$^2$, and a center distance to adjacent protrusion 8 of 0.5 to 1.0 mm so as to suppress line displacement on the outer panel with certainty while the lowering of quality of the external appearance of the outer surface, which is the design surface of the door outer panel, is prevented.

A sliding test press tooling which includes extremely small protrusions 8 was prepared and a flat plate sliding test was performed to measure a static friction coefficient. Conditions of the sliding test are collectively shown below.

Material: soft steel sheet having a sheet thickness of 0.7 mm

Shape of protrusions 8: diameter of 0.11 mm, height of 0.06 mm

Arrangement of protrusions 8: in a grid pattern with center distance of 0.7 mm

Shape of press tooling: 40 mm×30 mm, drawing in 30 mm direction

Drawing condition: length of 300 mm

Test (nominal) contact pressure: contact pressure generated in the actual forming being set based on FEM analysis.

FIG. 10 is a graph showing the relationship between a nominal contact pressure and a static friction coefficient which changes depending on the presence or absence of the protrusions 8.

As shown in the graph in FIG. 10, a static friction coefficient μ2 of a normal flat plate press tooling (no protrusion) is approximately 0.10 to 0.15. To the contrary, when the extremely small protrusions 8 are provided, a static friction coefficient μ1 increases to approximately 0.30.

When the height of the protrusions 8 is 5% or less with respect to the sheet thickness t of the blank, it is possible to prevent the lowering of quality of the external appearance of the outer surface, which is the design surface of the door outer panel.

In the description made heretofore, the punch 2 forming the upper die is movable and the die 3 forming the lower die is fixed. However, the punch 2 forming the upper die may be fixed, and the die 3 forming the lower die may be movable. Further, the die 3 may form the upper die, and the punch 2 may form the lower die.

That is, the production apparatus is not limited to the mode shown in FIGS. 1 to 8. Provided that a portion having a static friction coefficient increased by the particles 5a or the protrusions 8 is provided to the first portion of the punch 2 which includes at least one of the projecting portion 2b of the punch top portion 2a and the punch shoulder R portion 2c, line displacement of the character line on the door outer panel can be suppressed while the occurrence of forming defect, such as deflection or insufficient inflow, is suppressed.

Next, the present invention will be more specifically described with reference to examples.

Example 1

Under the following conditions of the press tooling and the conditions of the means 1 shown in Table 1, the punch 2 for evaluating line displacement shown in FIG. 11A and FIG. 11B was prepared, and press forming was performed on a specimen (TS270 MPa-class galvannealed steel sheet, a sheet thickness of 0.7 mm, a length of 400 mm, a width of 200 mm) using the production apparatus 1 which uses the means 1. Then, the amount of line displacement was quantitatively evaluated using evaluation parameter $S=L\times|H|^{1/3}$ described in Patent Document 1.

[Conditions of Press Tooling]
 BHF 20 tons
 Press speed 10 mm/s
 With lubrication
 First portion of punch: region A in FIG. 11A and FIG. 11B
 Particles 5a

TABLE 1

| Section | Conventional example | Inventive Example of present invention 1 | Inventive Example of present invention 2 |
|---|---|---|---|
| Presence or absence of particle fixing portion 5 | Absent | Present | Present |
| Kind of particles | — | CBN (Cubic boron nitride abrasive grain) | |
| Grain size | — | #200 | #800 |
| Height of holding layer 5b [μm] | — | 51.8 | 12.6 |
| Particle size of particles 5a [μm] | — | 74 | 18 |
| Particle ratio of particles 5a | — | 12.5 | 12.5 |
| Embedding ratio of particles 5a | — | 70 | 70 |
| Vickers hardness of particles 5a [HV] | — | 750 | 750 |
| Static friction coefficient | 0.17 | 0.39 | 0.36 |
| Difference in static friction coefficient with respect to flat plate | — | 0.22 | 0.19 |

The results are shown in the graph in FIG. 12. An evaluation parameter S value is calculated using a displacement width L [mm] so that a small S value means that the amount of line displacement is small.

As shown in the graph in FIG. 12, assuming an evaluation parameter S value of a flat plate in the conventional example as 1, an evaluation parameter S was improved to approximately 0.9 in Inventive Examples 1, 2 of the present invention.

Sensuous evaluation was also performed with respect to the Inventive Examples 1, 2 of the present invention by visual observation. Also in the sensuous evaluation, it was confirmed that line displacement is suppressed in the Inventive Examples 1, 2 of the present invention.

Example 2

Under test conditions shown in Table 2 using a production apparatus 1 where the means 1 is replaced with the means 2, FEM analysis was performed on the above-mentioned press tooling for evaluating line displacement, and the amount of line displacement was quantitatively evaluated using the evaluation parameter $S=L\times|H|^{1/3}$ described in Patent Document 1. As described in paragraph 0116, those skilled in the art can adjust a static friction coefficient by appropriately selecting a height, a diameter, a density, a center distance to an adjacent protrusion and the like.

TABLE 2

| | Conventional example | Inventive Example of present invention 1 | Inventive Example of present invention 2 | Inventive Example of present invention 3 |
|---|---|---|---|---|
| Presence or absence of protrusion | Absent | Present | | |
| Static friction coefficient | 0.1 | 0.15 | 0.2 | 0.3 |
| Difference in static friction coefficient with respect to reference | — | 0.05 | 0.1 | 0.2 |

In this FEM analysis, a friction coefficient of a portion in the vicinity of the projecting portion 2b of the punch 2 and a friction coefficient of the punch shoulder R portion 2c were partially increased by forming the protrusions 8. In such a state, the amount of movement (the amount of displacement) of an initial bent portion of the blank formed by the projecting portion 2b was obtained.

In this analysis, the reference of the static friction coefficient was set to 0.10.

FIG. 13A and FIG. 13B are graphs showing the analysis results. FIG. 13A shows the evaluation results in the case where the protrusions 8 were provided to the projecting portion 2b, and FIG. 13B shows the evaluation results in the case where the protrusions 8 were provided to the punch shoulder R portion 2c.

As shown in the graphs in FIG. 13A and FIG. 13B, assuming an evaluation parameter S value of the reference flat plate (static friction coefficient of 0.10) as 1, the evaluation parameter S was significantly improved in Inventive Examples 1 to 3 of the present invention where the static friction coefficient of a high contact pressure portion was increased.

REFERENCE SIGNS LIST 1 production apparatus
2 punch
2a punch top portion 2b projecting portion
2c punch shoulder R portion
2d remaining portion
2e punch vertical wall portion
3 die
3a recessed portion
4 blank holder
5 particle fixing portion
5a particle
5b holding layer
6 punch detachable portion
7 punch body
8 protrusion
9 chromium plating layer
S blank

The invention claimed is:

1. A method for producing an outer panel having a character line, which is a bent surface between two surfaces, by using a punch and a blank holder, and a die which opposes the punch and the blank holder, to perform press working on a blank disposed between the punch and the blank holder on one side and the die on the other side by draw forming or stretch forming, wherein
the punch includes a projecting portion for forming the bent surface and a punch shoulder R portion at a punch top portion,
wherein the punch includes a first portion, the first portion of the punch including at least one of the projecting portion and the punch shoulder R portion, and the punch includes a second portion which excludes the first portion, and
wherein the first portion of the punch further includes a particle fixing portion, the particle fixing portion configured to increase a static friction coefficient of the first portion of the punch with respect to the blank,
wherein the static friction coefficient of the first portion of the punch which includes at least one of the projecting portion and the punch shoulder R portion with respect to the blank is larger than a static friction coefficient of the second portion of the punch which excludes the first portion with respect to the blank,
wherein the punch includes the particle fixing portion having a holding layer which holds particles, and the particle fixing portion is provided to at least one of the projecting portion and the punch shoulder R portion, and
wherein an embedding ratio of the particles is 50 to 80%, and the embedding ratio is calculated as (a height of the holding layer/an average particle size of the particles)×100(%).

2. The method for producing an outer panel having a character line according to claim 1, wherein a difference between the static friction coefficient of the first portion with respect to the blank and the static friction coefficient of the second portion with respect to the blank is 0.05 or more.

3. The method for producing an outer panel having a character line according to claim 1, wherein the static friction coefficient is a static friction coefficient in a direction along which a concavity generated on the blank due to an initial strike of the projecting portion on the blank moves in a forming process.

4. The method for producing an outer panel having a character line according to claim 1, wherein at least one of the projecting portion and the punch shoulder R portion includes the particles having Vickers hardness of 700 HV or more.

5. The method for producing an outer panel having a character line according to claim 1, wherein the average particle size of the particles is 5 to 600 μm.

6. The method for producing an outer panel having a character line according to claim 1, wherein a particle ratio of the particles fixed is 5 to 20%, and the particle ratio is calculated as (a total volume of the particles/a volume of the particle fixing portion)×100(%).

7. The method for producing an outer panel having a character line according to claim 1, wherein the particle fixing portion is exchanged with another particle fixing portion according to an operating condition.

8. The method for producing an outer panel having a character line according to claim 1, wherein the particles come into contact with a non-design surface of the blank which is an inner surface of the outer panel.

9. A method for producing an outer panel having a character line, which is a bent surface between two surfaces, by using a punch and a blank holder, and a die, having a unitary structure, which opposes the punch and the blank holder, to perform press working on a blank disposed between the punch and the blank holder on one side and the die on the other side by draw forming or stretch forming, wherein
the punch includes a projecting portion for forming the bent surface and a punch shoulder R portion at a punch top portion,
wherein the punch includes a first portion, the first portion of the punch including at least one of the projecting portion and the punch shoulder R portion, and the punch includes a second portion which excludes the first portion, and
wherein the first portion of the punch further includes a particle fixing portion, the particle fixing portion configured to increase a static friction coefficient of the first portion of the punch with respect to the blank,
wherein the static friction coefficient of the first portion of the punch which includes at least one of the projecting portion and the punch shoulder R portion with respect to the blank is larger than a static friction coefficient of the second portion of the punch which excludes the first portion with respect to the blank,
wherein the punch includes the particle fixing portion having a holding layer which holds particles, and the particle fixing portion is provided to at least one of the projecting portion and the punch shoulder R portion, and
wherein an embedding ratio of the particles is 50 to 80%, and the embedding ratio is calculated as (a height of the holding layer/an average particle size of the particles)×100(%).

* * * * *